(12) United States Patent
Setlur et al.

(10) Patent No.: US 6,844,671 B2
(45) Date of Patent: Jan. 18, 2005

(54) HIGH LUMINOSITY PHOSPHOR BLENDS FOR GENERATING WHITE LIGHT FROM NEAR-UV/BLUE LIGHT-EMITTING DEVICES

(75) Inventors: Anant Achyut Setlur, Niskayuna, NY (US); Alok Mani Srivastava, Niskayuna, NY (US); Holly Ann Comanzo, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 184 days.

(21) Appl. No.: 10/356,163

(22) Filed: Jan. 31, 2003

(65) Prior Publication Data

US 2004/0150316 A1 Aug. 5, 2004

(51) Int. Cl.⁷ .............................. H01J 1/62; H01L 33/00
(52) U.S. Cl. ................ 313/503; 313/486; 252/301.4 R; 252/301.4 P
(58) Field of Search .................. 313/499–503, 313/486; 252/301.4 R, 301.4 P; 257/79

(56) References Cited

U.S. PATENT DOCUMENTS

| | | | |
|---|---|---|---|
| 5,777,350 A | | 7/1998 | Nakamura et al. ............. 257/96 |
| 6,621,211 B1 | * | 9/2003 | Srivastava et al. ........... 313/503 |
| 6,685,852 B2 | * | 2/2004 | Setlur et al. ........... 252/301.4 R |
| 2003/0067008 A1 | * | 4/2003 | Srivastava et al. ............ 257/79 |
| 2003/0111955 A1 | * | 6/2003 | McNulty et al. ............ 313/504 |

OTHER PUBLICATIONS

Shigeo Shionoya and William M. Yen (Ed.), "Phosphor Handbook," pp. 367–444, CRC Press, Boca Raton, Florida (1999).
G. Blasse and B.C. Grabmaier, "Luminescent Materials, " pp. 108–133, Springer–Verlag, Berlin, Germany (1994).

* cited by examiner

Primary Examiner—Nimeshkumar D. Patel
Assistant Examiner—Karabi Guharay
(74) Attorney, Agent, or Firm—Toan P. Vo; Patrick K. Patnode (57) ABSTRACT

The present invention provides phosphor blends that are excitable by electromagnetic radiation having wavelengths in the near Uv-to-blue range (from about 315 nm to about 480 nm) to emit a visible light in a range of wavelengths from about 490 nm to about 770 nm. A phosphor blend of the present invention comprises a mixture of at least two phosphors. The first phosphor of the mixture comprises $Sr_2P_2O_7:Eu^{2+},Mn^{2+}$; wherein at least one element selected from the group consisting of Ba, Zn, Ca, and Mg partially substitutes strontium. The second phosphor is at least one selected from the group consisting of $Sr_4Al_{14}O_{25}:Eu^{2+}$; (Ba, Sr, Ca)MgAl$_{10}$O$_{17}$:Eu$^{2+}$; (Ba, Sr, Ca)MgAl$_{10}$O$_{17}$:Eu$^{2+}$, Mn$^{2+}$; (Sr, Ba, Ca, Mg)$_5$(PO$_4$)$_3$Cl:Eu$^{2+}$; and 3.5 MgO.0.5MgF$_2$.GeO$_2$:Mn$^{4+}$.

35 Claims, 6 Drawing Sheets

HIGH LUMINOSITY PHOSPHOR BLENDS FOR GENERATING WHITE LIGHT FROM NEAR-UV/BLUE LIGHT-EMITTING DEVICES

This invention was first conceived or reduced to practice in the performance of work under contract 70NANB8H4022 with the United States National Institute of Standards and Technology (NIST). The United States of America may have certain rights to this invention.

BACKGROUND OF THE INVENTION

This invention relates to blends of phosphors that convert electromagnetic radiation in the near-ultraviolet ("near-UV")-to-blue wavelength range to white light. More particularly, this invention relates to phosphor blends that convert electromagnetic radiation emitted by UV light-emitting devices to white light. This invention also relates to light sources using such phosphor blends.

A phosphor is a luminescent material that absorbs radiation energy in a portion of the electromagnetic spectrum and emits energy in another portion of the electromagnetic spectrum. Phosphors of one important class are crystalline inorganic compounds of very high chemical purity and of controlled composition to which small quantities of other elements (called "activators") have been added to convert them into efficient fluorescent materials. With the right combination of activators and host inorganic compounds, the color and luminosity of the emission can be controlled. Most useful and well-known phosphors emit radiation in the visible portion of the electromagnetic spectrum in response to excitation by electromagnetic radiation outside the visible range. Well-known phosphors have been used in mercury vapor discharge lamps to convert the ultraviolet ("UV") radiation emitted by the excited mercury vapor to visible light. Other phosphors are capable of emitting visible light upon being excited by electrons (used in cathode ray tubes) or x rays (for example, scintillators in x-ray detection systems).

The efficiency of a lighting device that uses a phosphor increases as the difference between the wavelength of the exciting radiation and that of the emitted radiation narrows. Therefore, in the quest for improving efficiency of white light sources, effort has been dedicated to finding a source of stimulating radiation that has wavelengths longer than that of UV radiation and phosphors that respond to those wavelengths. Recent advances in light-emitting diode ("LED") technology have brought efficient LEDs emitting in the near UV-to-blue range. The term "LEDs" as used herein also includes laser diodes. While these lighting devices yield an emission spectrum that has a high color rendition index (CRI) value, the luminosity obtained from the device is lower than that desired. In certain applications, such as the instrument panel of an automobile, a high CRI value is desired, while the luminosity is not critical. It would be an advance to the technology of lighting to provide a range of phosphors that can be stimulated by the radiation emitted from near-UV/blue LED radiation sources to allow for flexibility in the use of phosphors for generating emitted light with a high luminosity at an acceptable CRI level. Such phosphors when combined with the emission from the near-UW/blue LEDs can provide luminous and efficient lighting devices that consume little power.

Therefore, there is a need to provide phosphor compositions that are excitable in the near UV-to-blue range and emit in the visible range such that they may be used flexibly to design light sources with a high luminosity.

BRIEF DESCRIPTION OF THE INVENTION

The present invention provides phosphor blends that are excitable by electromagnetic radiation having wavelengths in the near UV-to-blue range (from about 315 nm to about 480 nm) to emit a visible light in a range of wavelengths from about 490 nm to about 770 nm. A phosphor blend of the present invention comprises a mixture of at least two phosphors. The first phosphor of the mixture comprises $Sr_2P_2O_7:Eu^{2+},Mn^{2+}$ hereinafter "SPP"); wherein at least one element selected from the group consisting of Ba, Zn, Ca, and Mg partially substitutes strontium. The second phosphor is at least one selected from the group consisting of $Sr_4Al_{14}O_{25}:Eu^{2+}$ (hereinafter "SAE"); (Ba, Sr, Ca)$MgAl_{10}O_{17}:Eu^{2+}$ (hereinafter "BAM"); (Ba, Sr, Ca)$MgAl_{10}O_{17}:Eu^{2+},Mn^{2+}$ (hereinafter "BAMn"); (Sr, Ba, Ca, Mg)$_5(PO_4)_3Cl:Eu^{2+}$(hereinafter "SECA"); and $3.5MgO.0.5MgF_2.GeO_2:Mn^{4+}$ (hereinafter "MFG").

By mixing suitable proportions of these phosphors, composites of emission spectra may be created that provide a wide range of colors in the visible spectrum. Especially, white light sources having high luminosity, different correlated color temperatures ("CCT"), and CRIs may be created from a combination of near UV-to-blue LEDs and phosphor blends of the present invention.

In accordance with one aspect of the present invention, a white light illumination system comprises at least one light emitting element selected from the group consisting of light emitting diodes, laser diodes, and gas discharge devices, which light emitting elements are capable of emitting electromagnetic radiation having a wavelength from the near ultraviolet-to-blue range. The system further comprises a phosphor blend comprising a first phosphor and a second phosphor. The phosphor blend is capable of absorbing electromagnetic radiation having a wavelength in a range from about 315 nm to about 480 nm and emitting light having a wavelength in a visible spectrum. The first phosphor comprises $Sr_2P_2O_7:Eu^{2+},Mn^{2+}$; wherein at least one element selected from the group consisting of Ba, Zn, Ca, and Mg partially substitutes strontium. The second phosphor is at least one selected from the group consisting of $Sr_4Al_{14}O_{25}:Eu^{2+}$; (Ba, Sr, Ca)$MgAl_{10}O_{17}:Eu^{2+}$; (Ba, Sr, Ca)$MgAl_{10}O_{17}:Eu^{2+},Mn^{2+}$; (Sr, Ba, Ca, Mg)$_5$(PO$_4$)$_3$Cl:Eu$^{2+}$; and $3.5MgO.0.5MgF_2.GeO_2:Mn^{4+}$.

Other aspects, advantages, and salient features of the present invention will become apparent from a perusal of the following detailed description, which, when taken in conjunction with the accompanying figures, discloses embodiments of the present invention.

DETAILED DESCRIPTION OF THE INVENTION

The present invention provides phosphor blends that are excitable by electromagnetic radiation having wavelengths in the near UV-to-blue range (from about 315 nm to about 480 nm) to emit visible light in the wavelength range from about 490 nm to about 770 nm. In one embodiment of the invention, the wavelength of the exciting radiation is in the range from about 350 nm to about 450 nm. In another embodiment of the invention, the wavelength of the exciting radiation is in the range from about 370 nm to about 410 nm. A suitable near UV/blue LED for use with a phosphor blend of the present invention is one having an InGaN active layer as disclosed in U.S. Pat. No. 5,777,350. The term "near UV/blue LED" means an LED emitting in the wavelength range from about 315 nm to about 480 nm. Particularly useful are those LEDs having a GaN layer or having only a very small amount of In dopant in the GaN layer as these LEDs would emit radiation predominantly in the wavelength range less than about 400 nm.

In one embodiment of the invention, the phosphor blend of the present invention comprises a first phosphor and a second phosphor. The first phosphor comprises $Sr_2P_2O_7:Eu^{2+},Mn^{2+}$; wherein strontium is partially substituted by at least one element selected from the group consisting of Ba, Zn, Ca, and Mg. The second phosphor is selected from the group consisting of $Sr_4Al_{14}O_{25}:Eu^{2+}$; (Ba, Sr, Ca)$MgAl_{10}O_{17}:Eu^{2+}$; (Ba, Sr, Ca)$MgAl_{10}O_{17}:Eu^{2+}$, $Mn^{2+}$; $(Sr, Ba, Ca, Mg)_5(PO_4)_3Cl:Eu^{2+}$; and $3.5MgO.0.5MgF_2.GeO_2:Mn^{4+}$. In the formulas of the phosphors, the elements following the colons represent the activators or sensitizers, and are present at low atomic proportions compared to the metals, such as less than about 20 percent. A group of elements separated by commas in a set of parentheses represents those elements that are interchangeable at the same lattice site. One element or all elements of the group within the set of parentheses can be present in such a phosphor.

The phosphor blend is capable of absorbing electromagnetic radiation having a wavelength in a range from about 315 nm to about 480 nm and emitting light having a wavelength in a visible spectrum. Typically, emission in the visible spectrum comprises electromagnetic radiation having a wavelength in the range from about 490 nm to about 770 nm. It must be noted that the words electromagnetic radiation and light are used interchangeably herein.

$Sr_2P_2O_7:Eu^{2+},Mn^{2+}$ is a strontium pyrophosphate phosphor comprising europium (Eu) and manganese (Mn) as activators. Strontium or Sr may be partially substituted by at least one of barium (Ba), magnesium (Mg), calcium (Ca) and zinc (Zn) to form a phosphor termed as "doped SPP". Magnesium-doped SPP may be represented as $(Sr_{1-x-y-z}Eu_xMn_yMg_z)_2P_2O_7$, where $0<x\leq0.1$, $0<y\leq0.1$, $0<z\leq0.05$ and x, y and z represent the atomic fraction of Sr that has been substituted with the indicated elements in the phosphor. SPP has a high efficacy and high quantum efficiency for incident radiation having a peak wavelength between about 360 nm about 420 nm, such as that emitted by an LED. The Eu ions generally act as sensitizers and the Mn ions generally act as activators. Thus, the Eu ions absorb the incident energy (i.e. photons) emitted by the radiation source and transfer the absorbed energy to the Mn ions. The Mn ions are promoted to an excited state by the absorbed transferred energy and emit a broad radiation band having a peak wavelength that is located in the range from about 575 nm to about 595 nm when Mg is not present in the phosphor. When an amount of Sr in the range from about 1 atom percent to about 10 atom percent is substituted with Mg, a blue shift in the $Mn^{2+}$ luminescence and an increase in the $Eu^{2+}$ luminescence are observed. This means that the peak wavelength of radiation band emitted by the Mn ions occurs at a wavelength that is shorter than that in the absence of Mg. This effect results in a higher luminosity in a phosphor blend comprising a doped SPP phosphor. The partial substitution of Sr by Ba, Ca, or Zn also results in a similar effect.

Figure 1:
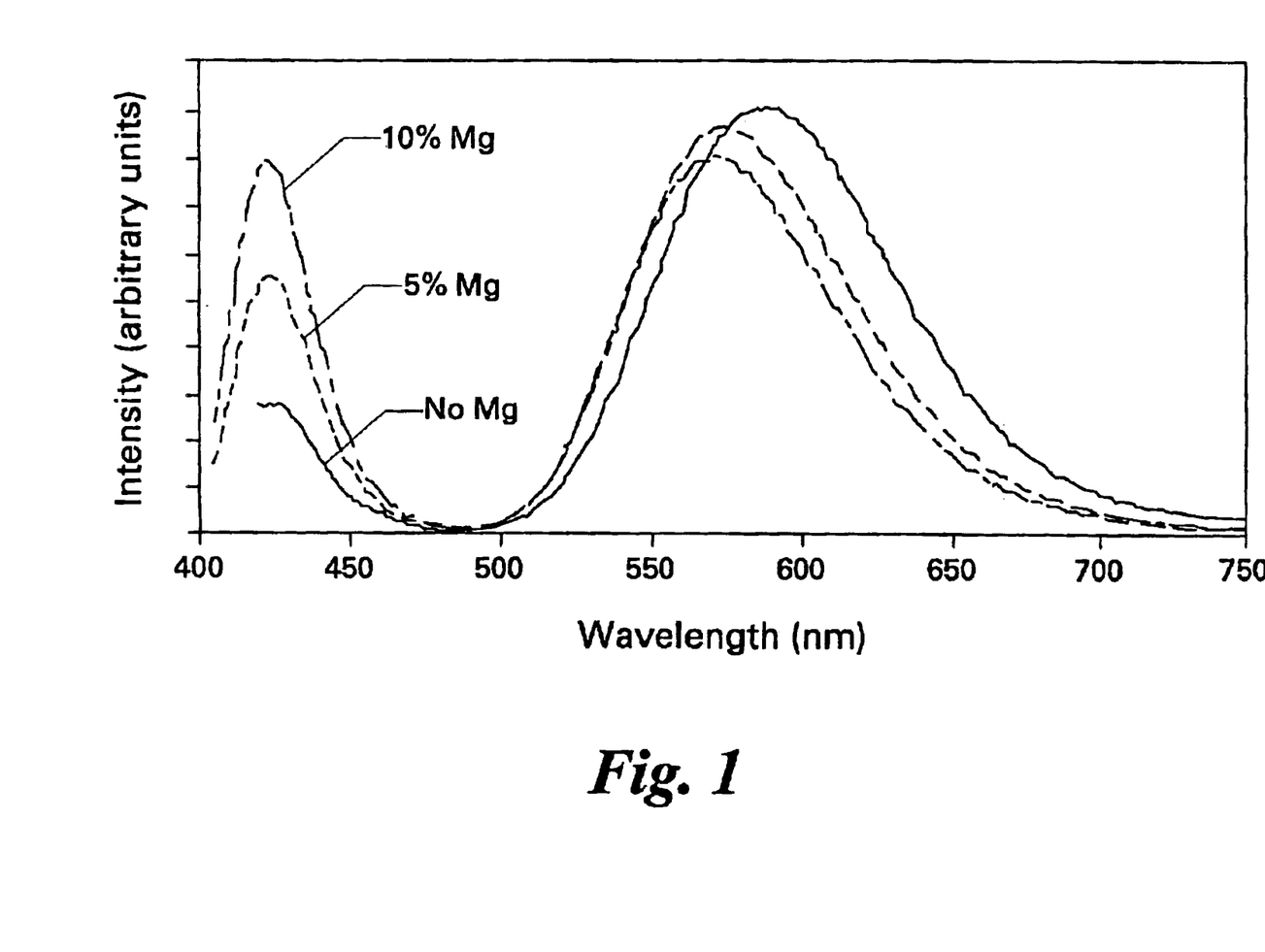
FIG. 1 represents emission spectra for exemplary phosphors in accordance with one embodiment of the invention, wherein the phosphors are doped with various amounts of Mg as indicated.

FIG. 1 shows the emission spectra of SPP and SPP wherein 5 atom % and 10 atom % of Sr are substituted with Mg. The blue shift is evident.

Figure 2:
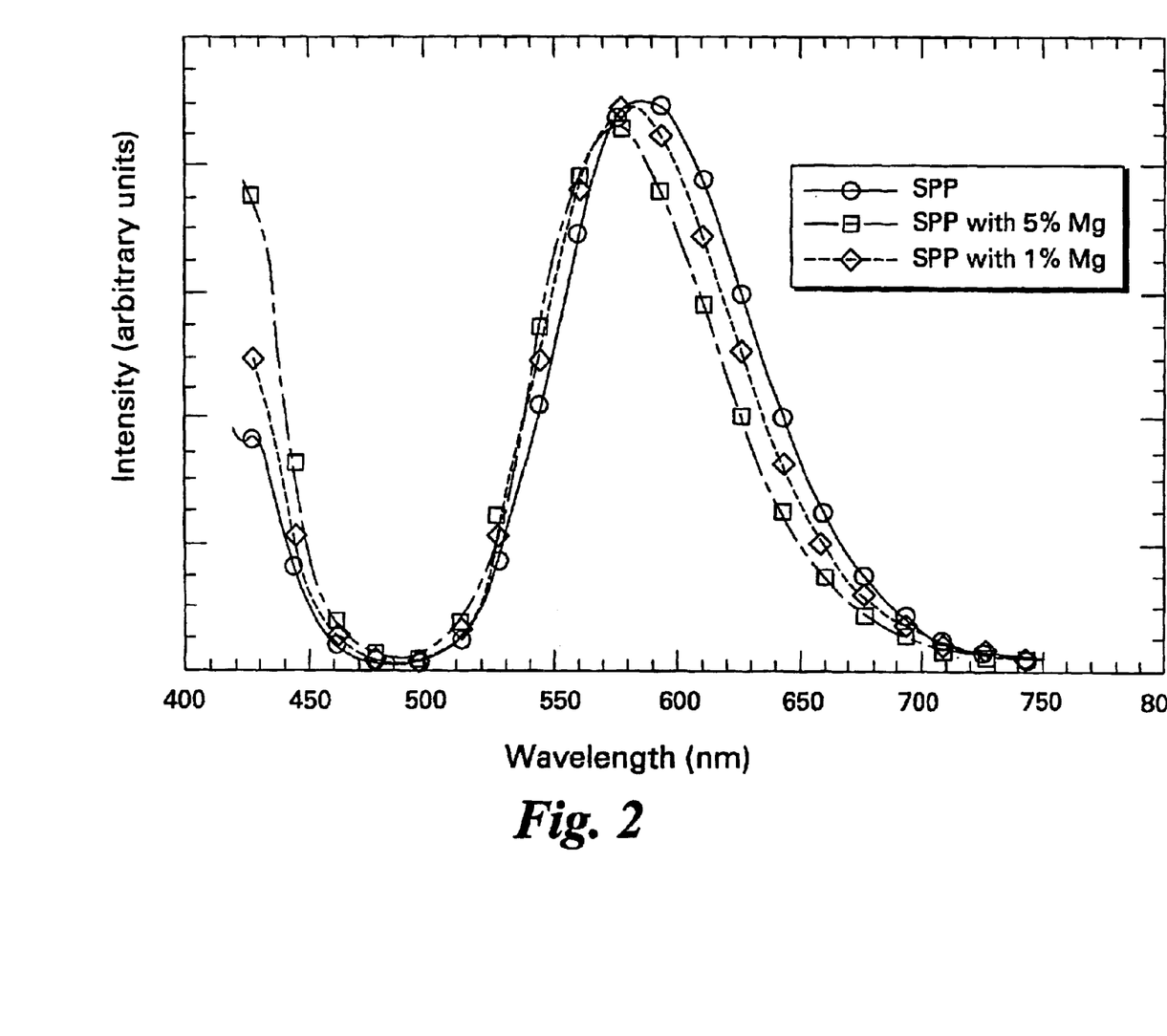
FIG. 2 shows the emission spectra of SPP and SPP wherein Sr is substituted with 1 and 5 atom % Mg, respectively.

FIG. 2 shows the emission spectra of SPP and SPP wherein 1 atom % and 5 atom % of Sr are substituted with Mg. It is noted that only 1 atom % of Mg dopant can begin to show a substantial increase in blue emission.

Figure 3:
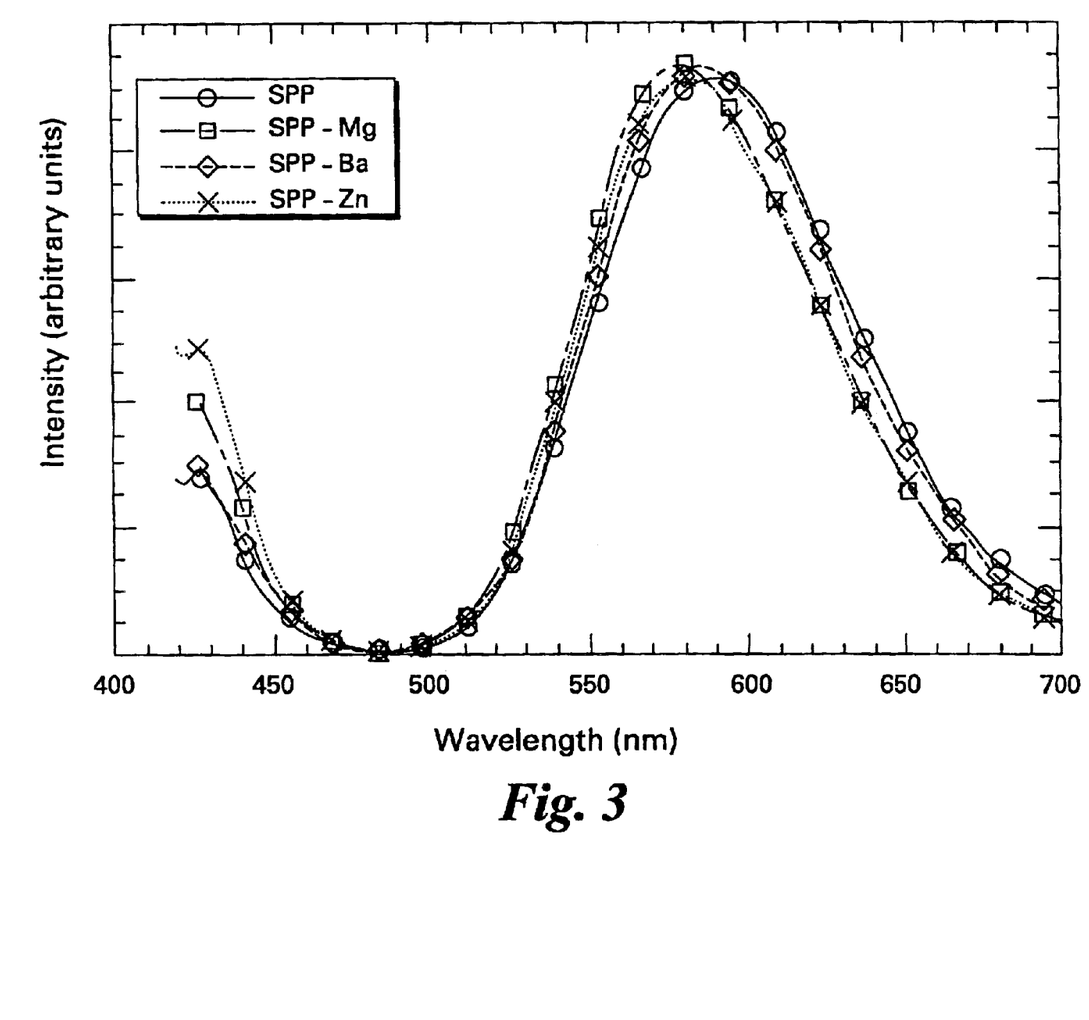
FIG. 3 shows the emission spectra of SPP and SPP wherein Sr is substituted with Mg, Ba, and Zn, respectively.

FIG. 3 shows the emission spectra for a $Sr_2P_2O_7:Eu^{2+}$, $Mn^{2+}$ phosphor and for $Sr_2P_2O_7:Eu^{2+},Mn^{2+}$ phosphors doped with Mg, Ba, and Zn. The blue shift in the $Mn^{2+}$ luminescence and the increase in the $Eu^{2+}$ luminescence can be clearly seen.

Doped SPP may be blended with other phosphors to create a composite emission spectrum that provides desired properties with respect to luminosity, CRI and CCT. Phosphors suitable for making such blends with SPP include SAE, BAM, BAMn, SECA, and MFG. In one embodiment of the invention, a phosphor blend comprises a doped SPP, such as an Mg-doped SPP, and at least one phosphor selected from the group consisting of SAE, BAM, BAMn, SECA, and MFG. In another embodiment of the invention, a phosphor blend comprises a doped SPP, SAE, and at least one phosphor selected from the group consisting of BAM, BAMn, SECA, and MFG. In another embodiment of the invention, a phosphor blend comprises a doped SPP, BAM, and at least one phosphor selected from the group consisting of SAE, BAMn, SECA, and MFG. In another embodiment of the invention, a phosphor blend comprises a doped SPP, SECA, and at least one phosphor selected from the group consisting of BAM, BAMn, SAE, and MFG. In another embodiment of the invention, a phosphor blend comprises doped SPP, BAMn, and at least one phosphor selected from the group consisting of BAM, SAE, SECA, and MFG. In another embodiment of the invention, a phosphor blend comprises doped SPP, MFG, and at least one phosphor selected from the group consisting of BAM, BAMn, SECA, and SAE. All of these phosphor blends are capable of absorbing electromagnetic radiation having a wavelength in a range from about 315 nm to about 480 nm and emitting light having a wavelength in a visible spectrum.

By mixing appropriate proportions of these phosphors, a composite emission spectrum of the blend may be created that provides a desired CCT and CRI with maximum luminosity (as defined by the lumens per watt of radiation input energy or "$L/W_{rad}$"). CCT of a light source is the temperature of a blackbody radiator that has the same color. An incandescent light bulb has a CCT of about 2000 K. Between 3000 K and 5000 K, a light source appears intensely white. Sunlight has a CCT of about 5000 K. As the CCT increases to between 8000 K and 10000 K, the light source appears blue. The CRI of a test light source is a rating that represents the degree of resultant color shift of a test object under that test light source in comparison with its color under a standard lamp of the same temperature. When the CRI value is 100, the test object appears to have the same color as when it is illuminated by the standard light source. Compositions of phosphor blends may be chosen to provide emission of white light having coordinates close to the black body locus of the chromaticity diagram of the Commission Internationale de l'Eclairage ("CIE").

The amount of each phosphor in the blend depends on the type of phosphor and the type of radiation source used. Individual phosphors have different characteristics with respect to the color of the luminescence, the luminosity, and the color rendition index. In one embodiment of the invention, the respective amounts of each of the phosphors in the blend is chosen such that the combination of the emission from the phosphor blend appears white to a human observer. In addition to white light, light of other colors may be generated from other selected blends of the aforementioned phosphors. A doped SPP blended with suitable phosphors, such as SAE, SECA, BAM, BAMN and MFG, results in a composite emission spectrum of the blend such that the luminosity of the emitted light is greater than about 350 lm/W and the CRI is greater than about 60.

The phosphors may be made by any conventional solid state reaction. For example, appropriate amounts of oxides and/or salts of the desired elements are mixed together thoroughly. The amounts are chosen so as to achieve the final desired composition of the phosphor. The mixture is fired at an appropriate high temperature, such as greater than 900° C., to decompose the oxide or salt precursors to the desired compound. The firing may be done in an oxidizing or reducing atmosphere depending on the phosphor. The firing may done in stages at two or more temperatures, each stage may be carried out in a different atmosphere.

Alternatively, an acidic solution of oxides and/or salts of the desired elements is prepared by dissolving such oxides and/or salts in a mineral or organic acid. A solution of ammonium hydroxide or an amine is added slowly into the acidic solution to precipitate compounds of the chosen elements until the precipitation is complete. Typically, this step is complete when the pH of the mixture of the solutions rises above 8. The precipitate is filtered, washed, and dried in air. The dried precipitate is fired as described above.

Figure 4:
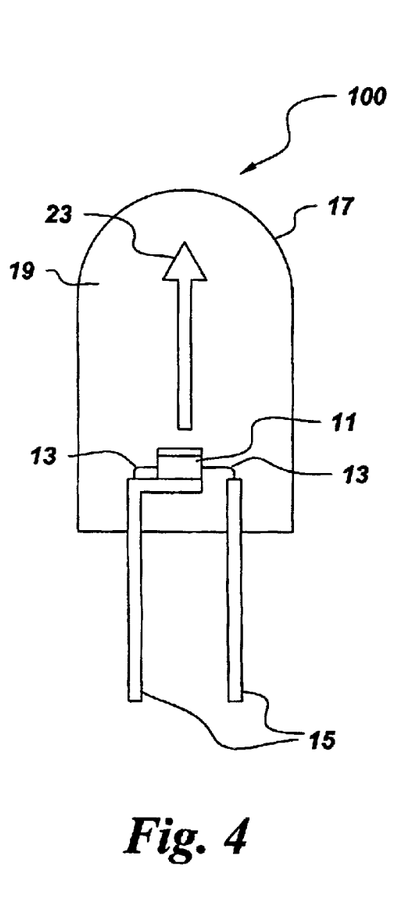
FIG. 4 is a cross-sectional schematic view of an illumination system using a light emitting diode in accordance with one embodiment of the invention.

In one embodiment of the present invention as shown in FIG. 4, a light emitting diode 11 emitting near UV-to-blue light in the range of about 315 nm to about 480 nm. In another embodiment of the invention, the light emitting diode 11 emitting near UV light in the range of about 370 nm to about 410 nm. An illumination system 100 includes the light emitting diode chip 11 and leads 13 electrically attached to the emitting diode chip. The leads 13 may comprise thin wires supported by a thicker lead frame 15 or the leads may comprise self-supported electrodes and the lead frame may be omitted. The leads 13 provide current to the light emitting diode chip 11 and, thus, cause the emitting diode chip 11 to emit radiation.

The light emitting diode chip 11 is encapsulated within a shell 17, which encloses the light emitting diode chip 11 and an encapsulant material 19. In one embodiment of the invention, the encapsulant material 19 comprises a UV tolerant epoxy. The shell 17 may be, for example, glass or plastic. The encapsulant material 19 may be, for example, an epoxy or a polymer material, such as silicone. The light emitting diode chip 11 may be supported, for example, by the lead frame 15, by the self-supporting electrodes, the bottom of the shell 17 or by a pedestal mounted to the shell or to the lead frame. The phosphor blend 21 may be disposed over or directly on the light emitting surface of the light emitting diode chip 11. Both the shell 17 and the encapsulant 19 should be substantially transparent to allow light 23 to be transmitted through those elements.

Figure 5:
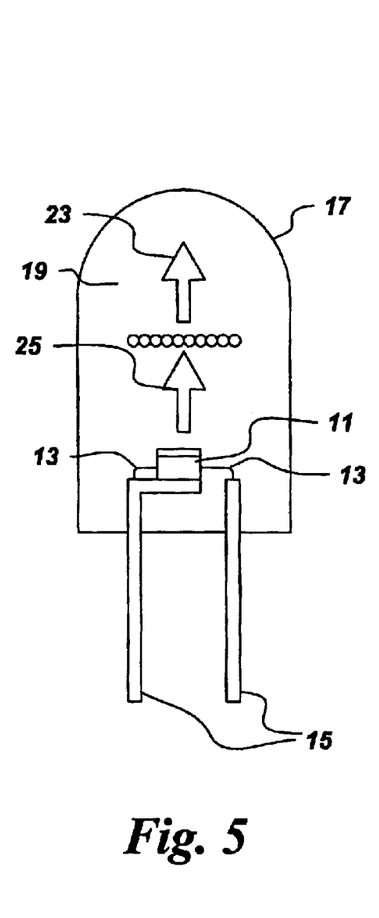
FIG. 5 is a cross-sectional schematic view of another illumination system using a light emitting diode in accordance with another embodiment of the invention.

In another embodiment of the invention, as shown in FIG. 5, the phosphor blend 21 is interspersed within the encapsulant material 19, instead of being disposed over the light emitting diode chip 11. The phosphor blend 21 may be interspersed within the encapsulant material 19, for example, by adding the phosphors to a polymer precursor, and then curing the polymer precursor to solidify the polymer material. Alternatively, the phosphors may be added to the encapsulant material. Other phosphor interspersion methods may also be used.

Figure 6:
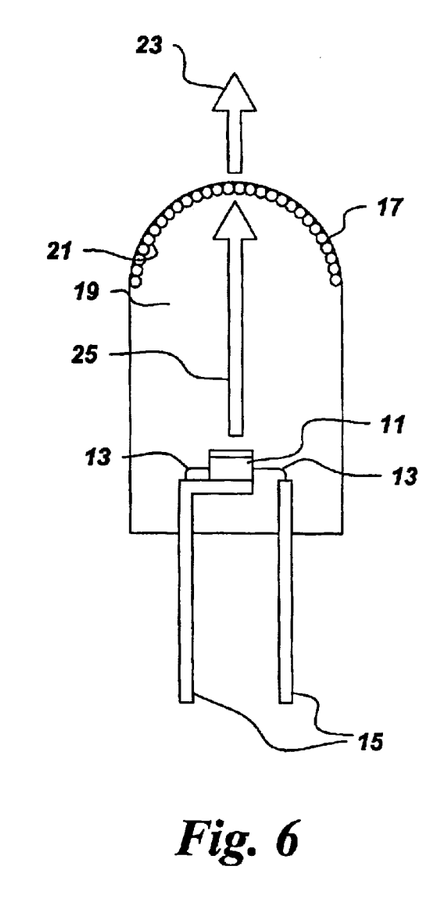
FIG. 6 is a cross-sectional schematic view of still another illumination system using a light emitting diode in accordance with another embodiment of the invention.

In another embodiment of the invention, as shown in FIG. 6, the phosphor blend 21 is formed on the shell 17, instead of being formed over the light emitting diode chip 11. In one embodiment of the invention, the phosphor layer is formed on the inside surface of the shell 17, although the phosphor layer also may be formed on the outside surface of the shell.

Of course, the embodiments of FIGS. 4, 5, and 6 may be combined and the phosphor may be located in any two or all three locations or in any other suitable location, such as separately from the shell or integrated into the light emitting diode.

Figure 7:
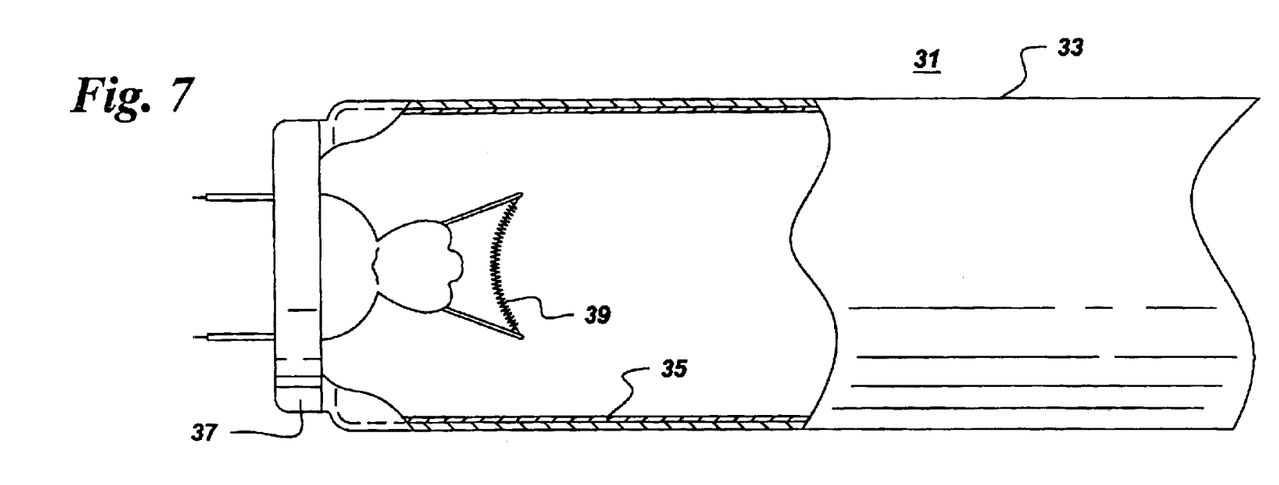
FIG. 7 is a cross-sectional schematic view of a fluorescent lamp incorporating a phosphor blend comprising a phosphor of the present invention.

According to another embodiment of the invention, the phosphors are placed into a white light illumination system comprising a fluorescent lamp radiation source. A portion of a fluorescent lamp is schematically illustrated in FIG. 7. The lamp 31 comprises a phosphor coating 35 comprising a blend of phosphors on a surface of a lamp cover 33, preferably the inner surface. In one embodiment of the invention, the fluorescent lamp 31 comprises a lamp base 37 and a cathode 39. The lamp cover 33 encloses a gas, such as mercury, which emits ultra-violet radiation in response to a voltage applied to the cathode 39.

Figure 8:
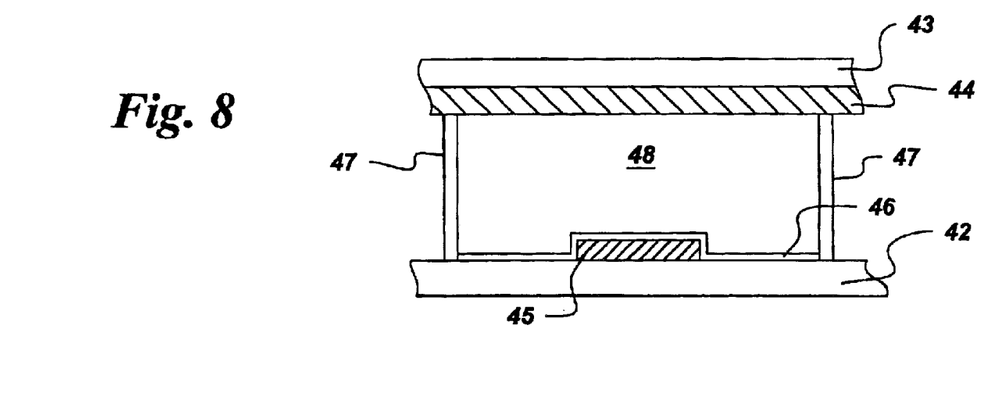
FIG. 8 is a cross-sectional schematic view of an illumination system using a plasma display and a phosphor blend comprising a phosphor of the present invention.

According to another embodiment of the invention, a phosphor blend is placed into a white light illumination system containing a plasma display device. Any plasma display device, such as an AC or a DC plasma display panel may be used. FIG. 8 schematically illustrates one cell of a DC plasma display device 41. The cell contains a first glass plate 42, a second glass plate 43, at least one cathode 44, at least one anode 45, a phosphor layer 46 comprising the phosphor blend, barrier ribs 47, and a noble gas space 48. In an AC plasma display device, an extra dielectric layer is added between the cathode and the gas space 48. An application of a voltage between the anode 45 and the cathode 44 causes the noble gas in space 48 to emit short wavelength vacuum ultra-violet radiation, which excites the phosphor layer 46 causing it to emit white light.

Applications for the high luminosity phosphor blends and illumination systems described herein include, but are not limited to, areas that are not well lit such as an automobile at night, an airplane during take-off and landing, a closet, an attic, and a shed. A plurality of such devices is utilized for lighting larger areas with better luminosity.

EXAMPLES

Eight blends of phosphors were prepared using phosphors prepared by the conventional solid state reaction process described earlier or using commercially available phosphors. These blends were prepared for a correlated color temperature of about 4000 K and a color point near the coordinate x=0.390, y=0.415. Table 1 below summarizes the phosphors in the blend and the proportion of the composite spectrum that the emission from the individual phosphor must contribute to in order to result in the specified color temperature, CRI, luminosity, and the distance from the black body locus. The luminosity, CRI, distance from black body locus and CIE color coordinates are also listed in Table 1, wherein "XXX" means "not present."

TABLE 1

| Example | SPP | SAE | SECA | BAMn | Dopant | Luminosity ($lm/W_{rad}$) | CRI | distance from black body locus | x | y |
|---|---|---|---|---|---|---|---|---|---|---|
| 1 | 0.745 | 0.265 | XXX | XXX | 1% Mg | 371 | 68 | 0.037 | 0.393 | 0.421 |
| 2 | 0.755 | XXX | 0.09 | 0.155 | 1% Mg | 381 | 65 | 0.031 | 0.39 | 0.4147 |
| 3 | 0.672 | 0.325 | XXX | XXX | 1% Ba | 352 | 75 | 0.033 | 0.391 | 0.417 |
| 4 | 0.699 | XXX | 0.101 | 0.2 | 1% Ba | 368 | 74 | 0.031 | 0.39 | 0.4147 |
| 5 | 0.745 | 0.265 | XXX | XXX | 1% Zn | 358.5 | 71 | 0.027 | 0.388 | 0.409 |
| 6 | 0.756 | XXX | 0.072 | 0.172 | 1% Zn | 376 | 67 | 0.031 | 0.39 | 0.4147 |
| 7 | 0.66 | 0.34 | XXX | XXX | XXX | 343.5 | 78 | 0.031 | 0.39 | 0.4147 |
| 8 | 0.685 | XXX | 0.104 | 0.211 | XXX | 361 | 77 | 0.031 | 0.39 | 0.4147 |

As can be seen from Table 1, examples 7 and 8 refer to a SPP and SAE blend and a SPP, SECA, and BAMn blend respectively without a dopant material in the SPP. Example 7 can be compared with Examples 1, 3, and 5 to determine the respective effects of about 1 weight percent of Mg, Ba, and Zn as the dopant material in SPP. The increase in luminosity from the use of Mg, Ba, and Zn as the dopant material is clearly evident. Example 8 can be compared with Examples 2, 4, and 6 to determine the respective effects of about 1 weight percent of Mg, Ba, and Zn as the dopant material in SPP. The increase in luminosity from the use of Mg, Ba, and Zn as the dopant material is again clearly evident.

Figure 9:
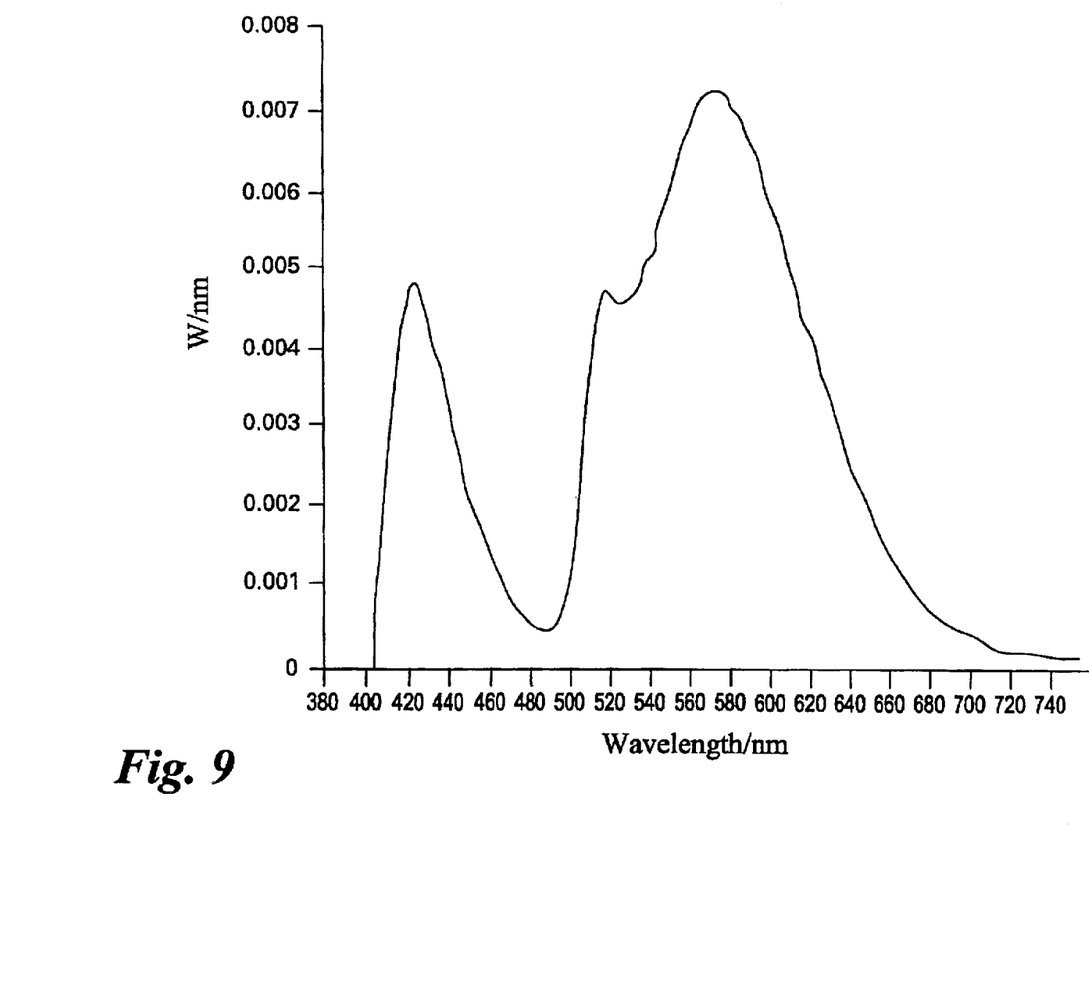
FIG. 9 shows a composite emission spectrum of a blend of $(Sr_{0.75}Eu_{0.1}Mn_{0.1}Mg_{0.05})_2P_2O_7$, BAM, and BAMn.

FIG. 9 shows a composite emission spectrum of a blend of $(SrO_{0.75}Eu_{0.1}Mn_{0.1}Mg_{0.05})_2P_2O_7$, BAM, and BAMn. This emission spectrum is a composite of the emission spectra for each of the phosphors in the blend.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A phosphor blend comprising a first phosphor and at least a second phosphor; said first phosphor comprising $Sr_2P_2O_7:Eu^{2+},Mn^{2+}$; wherein strontium is partially substituted by at least one element selected from the group consisting of Ba, Zn, Ca, and Mg; said at least second phosphor being selected from the group consisting of $Sr_4Al_{14}O_{25}:Eu^{2+}$; (Ba, Sr, Ca)$MgAl_{10}O_{17}:Eu^{2+}$; (Ba, Sr, Ca)$MgAl_{10}O_{17}:Eu^{2+},Mn^{2+}$; (Sr, Ba, Ca, Mg)$_5(PO_4)_3Cl:Eu^{2+}$; and 3.5 $MgO.0.5MgF_2.GeO_2:Mn^{4+}$; and said phosphor blend being capable of absorbing electromagnetic radiation having a wavelength in a range from about 315 nm to about 480 nm and emitting light having a wavelength in a visible spectrum.

2. The phosphor blend of claim 1, wherein said phosphor blend absorbs electromagnetic radiation substantially in a wavelength range from about 370 nm to about 410 nm.

3. The phosphor blend of claim 1, wherein said light emitted by said phosphor blend is white light.

4. The phosphor blend of claim 1, wherein said light emitted by said phosphor blend has a luminosity from about 350 lm/W to about 390 lm/W.

5. A phosphor blend comprising a first phosphor, a second phosphor, and a third phosphor; said first phosphor comprising $Sr_2P_2O_7:Eu^{2+},Mn^{2+}$; wherein strontium is partially substituted by at least one element selected from the group consisting of Ba, Ca, Zn, and Mg,; said second phosphor being selected from the group consisting of (Ba, Sr, Ca)$MgAl_{10}O_{17}:Eu^{2+}$; (Ba, Sr, Ca)$MgAl_{10}O_{17}:Eu^{2+},Mn^{2+}$; (Sr, Ba, Ca, Mg)$_5(PO_4)_3Cl:Eu^{2+}$; and 3.5 $MgO.0.5MgF_2.GeO_2:Mn^{4+}$; said third phosphor $Sr_4Al_{14}O_{25}:Eu^{2+}$; and said phosphor blend being capable of absorbing electromagnetic radiation having a wavelength in a range from about 315 nm to about 480 nm and emitting light having a wavelength in a visible spectrum.

6. The phosphor blend of claim 5, wherein said phosphor blend absorbs electromagnetic radiation substantially in a wavelength range from about 370 nm to about 410 nm.

7. The phosphor blend of claim 5, wherein said light emitted by said phosphor blend is white light.

8. The phosphor blend of claim 5, wherein said light emitted by said phosphor blend has a luminosity from about 350 lm/W to about 390 lm/W.

9. A phosphor blend comprising a first phosphor, a second phosphor, and a third phosphor; said first phosphor comprising $Sr_2P_2O_7:Eu^{2+},Mn^{2+}$; wherein strontium is partially substituted by at least one element selected from the group consisting of Ba, Ca, Zn, and Mg; said second phosphor being selected from the group consisting of $Sr_4Al_{14}O_{25}:Eu^{2+}$; (Ba, Sr, Ca)$MgAl_{10}O_{17}:Eu^{2+},Mn^{2+}$; (Sr, Ba, Ca, Mg)$_5(PO_4)_3Cl:Eu^{2+}$; and 3.5 $MgO.0.5MgF_2.GeO_2:Mn^{4+}$; said third phosphor comprising (Ba, Sr, Ca)$MgAl_{10}O_{17}:Eu^{2+}$; and said phosphor blend being capable of absorbing electromagnetic radiation having a wavelength in a range from about 315 nm to about 480 nm and emitting light having a wavelength in a visible spectrum.

10. The phosphor blend of claim 9, wherein said phosphor blend absorbs electromagnetic radiation substantially in a wavelength range from about 370 nm to about 410 nm.

11. The phosphor blend of claim 9, wherein said light emitted by said phosphor blend is white light.

12. The phosphor blend of claim 9, wherein said light emitted by said phosphor blend has a luminosity from about 350 lm/W to about 390 lm/W.

13. A phosphor blend comprising a first phosphor, a second phosphor, and a third phosphor; said first phosphor comprising $Sr_2P_2O_7:Eu^{2+},Mn^{2+}$; wherein strontium is partially substituted by at least one element selected from the group consisting of Ba, Ca, Zn, and Mg; said second phosphor being selected from the group consisting of (Ba, Sr, Ca)$MgAl_{10}O_{17}:Eu^{2+}$; (Ba, Sr, Ca)$MgAl_{10}O_{17}:Eu^{2+}$, $Mn^{2+}$; $Sr_4Al_{14}O_{25}:Eu^{2+}$; and 3.5 $MgO.0.5MgF_2.GeO_2:Mn^{4+}$; said third phosphor comprising $(Sr, Ba, Ca, Mg)_5(PO_4)_3Cl:Eu^{2+}$; and said phosphor blend being capable of absorbing electromagnetic radiation having a wavelength in a range from about 315 nm to about 480 nm and emitting light having a wavelength in a visible spectrum.

14. The phosphor blend of claim 13, wherein said phosphor blend absorbs electromagnetic radiation substantially in a wavelength range from about 370 nm to about 410 nm.

15. The phosphor blend of claim 13, wherein said light emitted by said phosphor blend is white light.

16. The phosphor blend of claim 13, wherein said light emitted by said phosphor blend has a luminosity from about 350 lm/W to about 390 lm/W.

17. A phosphor blend comprising a first phosphor, a second phosphor, and a third phosphor; said first phosphor comprising $Sr_2P_2O_7: Eu^{2+},Mn^{2+}$; wherein strontium is partially substituted by at least one element selected from the group consisting of Ba, Ca, Zn, and Mg; said second phosphor being selected from the group consisting of $(Ba, Sr, Ca)MgAl_{10}O_{17}:Eu^{2+}$; $Sr_4Al_{14}O_{25}: Eu^{2+}$; $(Sr, Ba, Ca, Mg)_5(PO_4)_3Cl:Eu^{2+}$; and 3.5 $MgO.0.5MgF_2.GeO_2:Mn^{4+}$; said third phosphor comprising $(Ba, Sr, Ca)MgAl_{10}O_{17}Eu^{2+}Mn^{2+}$; and said phosphor blend being capable of absorbing electromagnetic radiation having a wavelength in a range from about 315 nm to about 480 nm and emitting light having a wavelength in a visible spectrum.

18. The phosphor blend of claim 17, wherein said phosphor blend absorbs electromagnetic radiation substantially in a wavelength range from about 370 nm to about 410 nm.

19. The phosphor blend of claim 17, wherein said light emitted by said phosphor blend is white light.

20. The phosphor blend of claim 17, wherein said light emitted by said phosphor blend has a luminosity from about 350 lm/W to about 390 lm/W.

21. A phosphor blend comprising a first phosphor, a second phosphor, and a third phosphor; said first phosphor comprising $Sr_2P_2O_7:Eu^{2+},Mn^{2+}$; wherein strontium is partially substituted by at least one element selected from the group consisting of Ba, Ca, Zn, and Mg; said second phosphor being selected from the group consisting of $(Ba, Sr, Ca)MgAl_{10}O_{17}:Eu^{2+}$; $(Ba, Sr, Ca)MgAl_{10}O_{17}:Eu^{2+}, Mn^{2+}$; $(Sr, Ba, Ca, Mg)_5(PO_4)_3Cl:Eu^{2+}$; and $Sr_4Al_{14}O_{25}:Eu^{2+}$; said third phosphor comprising 3.5 $MgO.0.5MgF_2.GeO_2:Mn^{4+}$; and said phosphor blend being capable of absorbing electromagnetic radiation having a wavelength in a range from about 315 nm to about 480 nm and emitting light having a wavelength in a visible spectrum.

22. The phosphor blend of claim 21, wherein said phosphor blend absorbs electromagnetic radiation substantially in a wavelength range from about 370 nm to about 410 nm.

23. The phosphor blend of claim 21, wherein said light emitted by said phosphor blend is white light.

24. The phosphor blend of claim 21, wherein said light emitted by said phosphor blend has a luminosity is from about 350 lm/W to about 390 lm/W.

25. A phosphor blend comprising a mixture comprising (a) $(Sr_{1-y-z}Eu_xMn_yMg_z)_2P_2O_7:Eu^{2+},Mn^{2+}$; wherein $0<x\leq0.1$, $0<y\leq0.1$, $0<z\leq0.0.05$; (b) $(Ba, Sr, Ca)MgAl_{10}O_{17}:Eu^{2+},Mn^{2+}$; and (c) $(Sr, Ba, Ca, Mg)_5(PO_4)_3Cl:Eu^{2+}$; said phosphor blend being capable of absorbing electromagnetic radiation having wavelengths in a range from about 315 nm to about 480 nm and emitting light having wavelengths in a visible spectrum.

26. The phosphor blend of claim 25, wherein said light emitted by said phosphor blend has a luminosity is greater than about 350 lm/W.

27. The phosphor blend of claim 25, wherein said light emitted by said phosphor blend is white light.

28. A light source comprising:

(a) at least one light-emitting element selected from the group consisting of light emitting diodes, laser diodes, and gas discharge devices, said light emitting elements being capable of emitting electromagnetic radiation having a wavelength in a range from near ultraviolet to blue; and (b) a phosphor blend disposed to receive said electromagnetic radiation emitted by said light emitting element, said phosphor blend comprising:

(1) a first phosphor comprising $Sr_2P_2O_7:Eu^{2+},Mn^{2+}$; wherein strontium is partially substituted by at least one element selected from the group consisting of Ba, Ca, Zn, and Mg; and (2) at least a second phosphor selected from the group consisting of $Sr_4Al_{14}O_{25}:Eu^{2+}$; $(Ba, Sr, Ca)MgAl_{10}O_{17}:Eu^{2+}$; $(Ba, Sr, Ca)MgAl_{10}O_{17}:Eu^{2+}, Mn^{2+}$; $(Sr, Ba, Ca, Mg)_5(PO_4)_3Cl:Eu^{2+}$; and 3.5 $MgO.0.5MgF_2.GeO_2:Mn^{4+}$;

said phosphor blend being capable of absorbing electromagnetic radiation having a wavelength in a range from about 315 nm to about 480 nm and emitting light having a wavelength in a visible spectrum.

29. The light source of claim 28, wherein said light emitting element emits electromagnetic radiation in a wavelength from about 315 nm to about 480 nm.

30. The light source of claim 28, wherein said light emitting element emits electromagnetic radiation from about 370 nm to about 410 nm wavelength.

31. The light source of claim 28, wherein said light emitted by said phosphor blend is white light.

32. A light source comprising:

(a) at least one light emitting element selected from the group consisting of light emitting diodes, laser diodes, and gas discharge devices, said light emitting element being capable of emitting electromagnetic radiation having wavelengths in a range from near ultraviolet to blue; and (b) a phosphor blend disposed to receive said electromagnetic radiation emitted by said light emitting element, said phosphor blend comprising a first phosphor, a second phosphor, and a third phosphor, said first phosphor comprising $(Sr_{1-x-y-z}Eu_xMn_yMg_z)_2P_2O_7:Eu^{2+}Mn^{2+}$; wherein $0<x\leq0.1$, $0<y\leq0.1$, $0<z\leq0.05$; said second phosphor comprising $(Ba, Sr, Ca)MgAl_{10}O_{17}:Eu^{2+}Mn^{2+}$; and said third phosphor comprising $(Sr, Ba, Ca, Mg)_5(PO_4)_3Cl:Eu^{2+}$; said phosphor blend being capable of absorbing electromagnetic radiation having a wavelength in a range from about 315 nm to about 480 nm and emitting light having a wavelength in the visible spectrum.

33. The light source of claim 32, wherein said light emitting element emits electromagnetic radiation in a wavelength from about 315 nm to about 480 nm.

34. The light source of claim 32, wherein said light emitting element preferably emits electromagnetic radiation from about 370 nm to about 410 nm.

35. The light source of claim 32, wherein said light emitted by said phosphor blend is white light.

* * * * *